United States Patent
Gluck et al.

(10) Patent No.: US 11,305,196 B1
(45) Date of Patent: Apr. 19, 2022

(54) PROMOTING FAIR ONLINE GAME PLAY THROUGH DISADVANTAGED INTERACTIONS WITH ONLINE GAMING

(71) Applicant: Electronic Arts Inc., Redwood City, CA (US)

(72) Inventors: Michael Gluck, Cologne (DE); Geoff Green, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/775,905

(22) Filed: Jan. 29, 2020

Related U.S. Application Data

(60) Provisional application No. 62/822,441, filed on Mar. 22, 2019.

(51) Int. Cl.
  *A63F 13/75* (2014.01)
  *A63F 13/79* (2014.01)
  *A63F 13/30* (2014.01)

(52) U.S. Cl.
  CPC .............. *A63F 13/75* (2014.09); *A63F 13/30* (2014.09); *A63F 13/79* (2014.09); *A63F 2300/535* (2013.01); *A63F 2300/5546* (2013.01); *A63F 2300/5586* (2013.01)

(58) Field of Classification Search
  None
  See application file for complete search history.

(56) References Cited

U.S. PATENT DOCUMENTS

| | | | | |
|---|---|---|---|---|
| 8,221,238 | B1 * | 7/2012 | Shaw ...................... | A63F 13/79 463/42 |
| 2004/0242321 | A1 * | 12/2004 | Overton ................... | A63F 13/75 463/29 |
| 2014/0357355 | A1 * | 12/2014 | Ren .......................... | A63F 13/30 463/29 |
| 2015/0038218 | A1 * | 2/2015 | Barclay ............... | G07F 17/3237 463/25 |
| 2015/0273339 | A1 * | 10/2015 | Lavery .................... | A63F 13/00 463/29 |
| 2016/0296840 | A1 * | 10/2016 | Kaewell ................. | A63F 13/352 |
| 2020/0078688 | A1 * | 3/2020 | Kaethler ................. | A63F 13/67 |

* cited by examiner

*Primary Examiner* — Jason T Yen
(74) *Attorney, Agent, or Firm* — Lee & Hayes, P.C.

(57) ABSTRACT

A cheating enforcement system and method determines if a player profile that is to play an online game is linked to another player profile that had been identified as cheating. If such a link is found, then one or more penalties may be imposed on the player profile, so that penalties for cheating cannot be averted by a player by opening a new player profile to play the online game. If a certain period of time has transpired since cheating was detected for the other player profile, then the one or more penalties may be removed from the player profile. The penalties imposed on the player profile may include server-side hit detection, latency penalty, damage scaling, and/or dropped moves. In the case of a chain of linked player profiles, severity of penalties may increase based on the number of linked accounts where cheating use was detected.

20 Claims, 9 Drawing Sheets

| PENALTY SEVERITY LEVEL | GAME PLAY PENALTIES |
|---|---|
| 0: TRUSTED GAME PLAY (NORMAL GAME PLAY) | • NO PENALTIES |
| 1: LOW UNTRUSTED GAME PLAY | • SERVER-SIDE HIT DETECTION |
| 2: MEDIUM-LOW UNTRUSTED GAME PLAY | • SERVER-SIDE HIT DETECTION<br>• REMOVE LATENCY COMPENSATION/ADD LATENCY |
| 3: MEDIUM UNTRUSTED GAME PLAY | • SERVER-SIDE HIT DETECTION<br>• REMOVE LATENCY COMPENSATION/ADD LATENCY<br>• SCALE DOWN DAMAGE – 80% |
| 4: MEDIUM-HIGH UNTRUSTED GAME PLAY | • SERVER-SIDE HIT DETECTION<br>• REMOVE LATENCY COMPENSATION/ADD LATENCY<br>• SCALE DOWN DAMAGE – 60% |
| 5: HIGH UNTRUSTED GAME PLAY | • SERVER-SIDE HIT DETECTION<br>• REMOVE LATENCY COMPENSATION/ADD LATENCY<br>• SCALE DOWN DAMAGE – 60%<br>• DROP MOVES – 10% |
| 6: VERY HIGH UNTRUSTED GAME PLAY | • SERVER-SIDE HIT DETECTION<br>• REMOVE LATENCY COMPENSATION/ADD LATENCY<br>• SCALE DOWN DAMAGE – 60%<br>• DROP MOVES – 20% |
| 7: HIGHEST UNTRUSTED GAME PLAY | • SERVER-SIDE HIT DETECTION<br>• REMOVE LATENCY COMPENSATION/ADD LATENCY<br>• SCALE DOWN DAMAGE – 40%<br>• DROP MOVES – 33% |

FIG. 3

| Moves Made by Player Profile | Moves Implemented in Game Play with Proportion of Dropped Moves = 20% |
|---|---|
| ← | ← |
| ← | ← |
| ↑ | ↑ |
| ↓ | ↓ |
| ↓ | <ACTION DROPPED> |
| FIRE GUN | FIRE GUN |
| ↓ | ↓ |
| → | → |
| → | → |
| CROUCH | <ACTION DROPPED> |
| → | → |
| ↑ | ↑ |
| ↑ | ↑ |

FIG. 7

PROMOTING FAIR ONLINE GAME PLAY THROUGH DISADVANTAGED INTERACTIONS WITH ONLINE GAMING

CROSS REFERENCE TO RELATED APPLICATIONS

This application claims the benefit of U.S. Provisional Application No. 62/822,441 filed Mar. 22, 2019, entitled "Promoting Fair Game Play Through Disadvantaged Interactions With Online Gaming," which is incorporated herein by reference in its entirety.

BACKGROUND

Online gaming allows for players to play a variety of electronic and/or video games with each other via network connectivity, such as via the Internet. Users who wish to play a game may be matched with each other to play the game, even though those players may be remotely located from each other. This online gaming may be enabled by online gaming system(s) to which each of the players may connect using client devices.

Some online gamers may engage in cheating by a variety of mechanisms, such as using internet robots (e.g., bots), or automated mechanisms that may interact with the online gaming system(s). The bots may give the cheating player an unfair advantage during portions of gameplay, which degrades the gameplay experience for non-cheating players. Other cheating mechanisms may include rendering overlays that may show player information that may otherwise be hidden, performing actions that would otherwise not be possible without cheating, and/or sending false information, such as inflated damage assessments. Cheating by some players can make the online game less enjoyable for those who are not cheating. Often times when a player is caught cheating, he or she creates a new player account and resumes cheating with his or her new player account. Thus, these cheating players may become persistent by creating and playing with a new player account until they are again caught cheating. This reduces the enjoyment for others who are playing the online game.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 illustrates a chart illustrating an example hierarchy of penalties and penalty severity levels, in accordance with example embodiments of the disclosure.

FIG. 7 illustrates a chart with an example of dropped moves for a player profile, in accordance with example embodiments of the disclosure.

DETAILED DESCRIPTION

Figure 1:
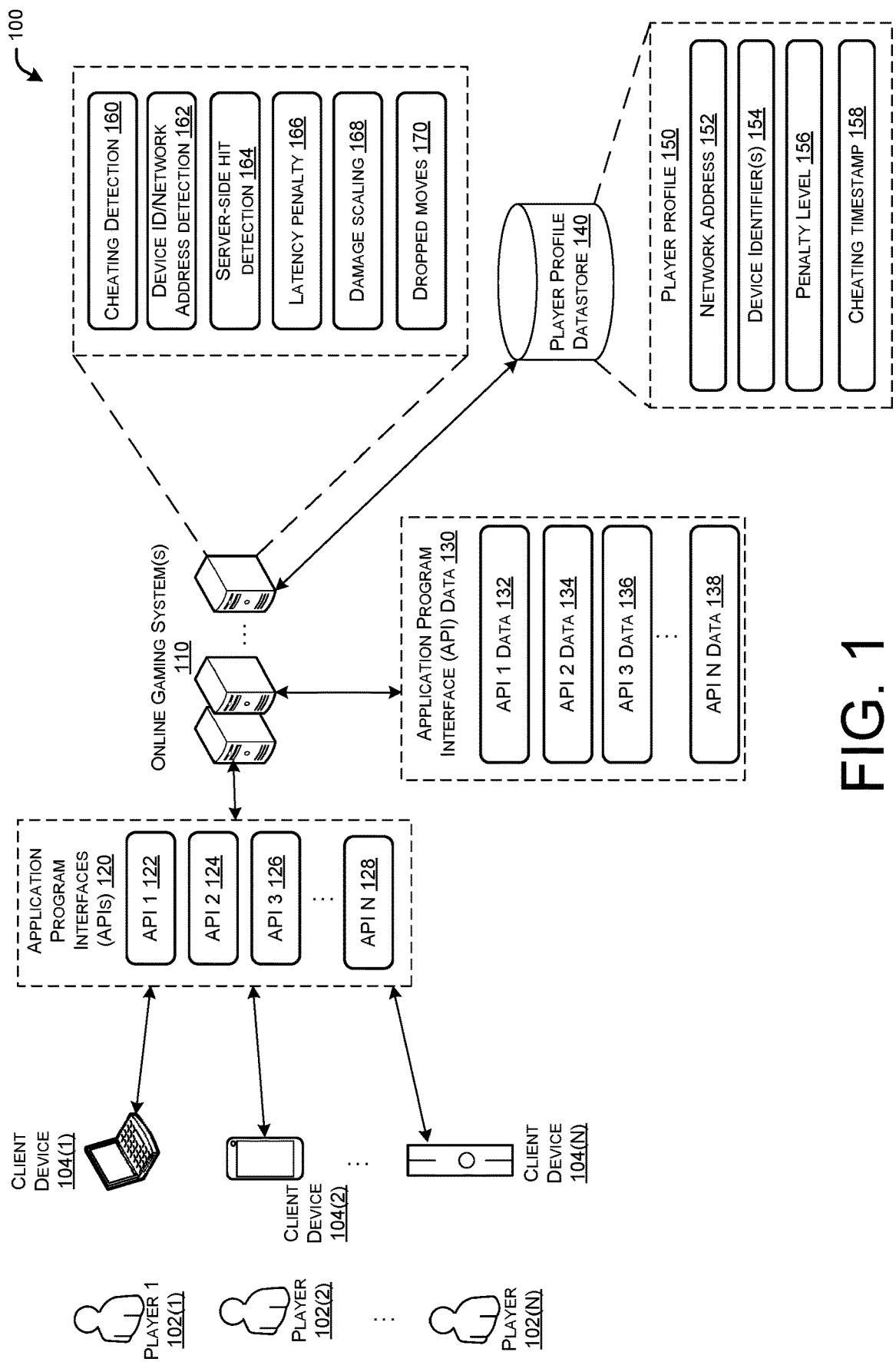
FIG. 1 illustrates a schematic diagram of an example environment with online gaming system(s) to enable online gaming via client device(s) and disadvantaged interactions, in accordance with example embodiments of the disclosure.

Example embodiments of this disclosure describes methods, apparatuses, computer-readable media, and system(s) for identifying and penalizing online game players who create new player accounts after being caught cheating by any variety of mechanisms during online game play. Common cheating mechanisms employed by a cheating player may include, for example, using bots to gain an advantage during portions of game play, rendering overlays that may show player information that may otherwise be hidden, performing actions that would otherwise not be possible without cheating, and/or sending false information, such as inflated damage assessments. For example, a player may deploy a bot to cheat during online game play, and when his or her cheating is detected, the player account may be banned from further online game play. However, the player may create a new player profile to attempt to avert any repercussions of cheating. In some cases, the player may start cheating again, such as by using a bot with the new player profile that he or she creates or by any other cheating mechanism. Thus, the cheating player may try to circumvent penalties associated with being caught cheating, and in some cases, may cheat again. By disincentivizing and/or penalizing cheating, online game play may be more fair and enjoyable for those players who do not cheat. The disclosure herein address these and other issues in online gaming.

Under normal game playing interactions, without the player cheating using a bot, game playing parameters, representing updates in the online game and moves or actions that the player wishes to make, may be sent back and forth between the player's client device and an online gaming system that hosts the online game. These parameters may be passed back and forth between the client devices and the online gaming system in the form of data packets via APIs of the game being played. These APIs allow for the standardization of the parameters, such as by providing a format and/or set of rules by which a player's client device and the online gaming system communicate with each other to allow the player to play the game.

Based at least in part on parameters received by the client device via APIs of the online gaming system, the content of the game may be rendered at the client device of a player. Additionally, the client device may receive player input, such as via a joystick, touchscreen, mouse, and/or any suitable user interface device. The client device may use the user input to generate parameters representative of the user input which may then be communicated to the online gaming system via the APIs. This communication of parameters from the client device to the online gaming system via the APIs may be referred to as API calls. A particular online game may include more than one API to which API calls may be made by a client device on behalf of a particular player with a corresponding player profile. The player profile may be used for identifying the player and/or for various other purposes, such as providing access to online game play.

A player may cheat on an online game by using a bot that makes API calls on behalf of the player for certain functions within the online game. In other words, the bot may interface with the online game via the APIs of the online game and play portions of the game instead of the player or provide automated assistance to the player. The bot may be able to perform game functions better than the player, thereby providing the player with an unfair advantage by using the bot. The use of a bot by a player, therefore, is cheating by the player and can reduce the enjoyment of the game for other players playing the online game.

Other cheating mechanisms used by a player may include accessing information that may otherwise be hidden if not cheating. For example, enhanced mapping capabilities may be accessed, where the location of other players on a virtual playing space may be exposed. Such information provided to a player would give that player an unfair advantage over other players who do not have access to such information. This type of information may be exposed to a cheating player by due to the cheating player accessing, via his or her client device, such information from the APIs used to communicate between the client devices and the online gaming systems hosting the online game. A cheating player may install software on his or her client device to interact with the online game in a manner to access this type of information about other players and/or other information that would otherwise be hidden.

Another cheating mechanism may include sending false information client device of a cheating player to the online gaming system. For example, inflated damage assessments of opposing players may be sent from a cheating player's client device to the online gaming system hosting the online game. Thus, incorrect information that is beneficial for the cheating player may be sent, rather than true information that would be sent if the player was not cheating. Again, this type of false information may be sent on behalf of the cheating player by software running on the cheating player's client device that interacts with the online game on the client device and/or the online gaming system via the APIs used to communicate between the client device and the online gaming systems. Although some examples of cheating are discussed here, it should be understood that mechanisms to prevent cheating to enhance the player experience may be applied to any suitable type of cheating on online gaming. In other words, the embodiments discussed herein may be applied to any type of actions that would otherwise not be possible without cheating.

According to example embodiments of the disclosure, when a player profile is first found to be cheating, the player profile may be linked with a lowest level of severity of player penalty and the player profile may be banned from online game play. If another player profile is created and if it is found that the new player profile is related to the banned player profile, then the new player profile may be allowed in online game play, but with this lowest level of severity of player penalty imposed on it. This lowest level of player penalty may involve disabling one or more functions or processes on the online game and/or adding latency to game play of the player profile. If the new player profile is also found to be cheating, then a greater level of severity of player penalty may be associated with the new player profile and the new player profile may be banned from further game play.

Continuing with the example above, if yet another new player profile is created and is found to be linked and/or related to the newly banned player profile, then the newest player profile may be allowed to play the online game at the present level of severity of player penalty (e.g., greater severity than the lowest level of severity of player penalty). In this way, when a player profile is linked to other player profile(s) that have previously cheated, the new player profile may be disadvantaged relative to other players of the online game. If the newest player profile is not caught cheating, then it may be allowed to continue playing the online game at its current level of severity of player penalty. If, however, the newest player profile is also found to be cheating, then the newest player profile may again be banned and the level of severity of player penalty may yet be increased in a similar manner as described above, until a highest level of severity of player penalty is reached.

As described in the example above, a player may create a new player profile to access an online game when he or she is caught cheating and banned from further online game play with a previous player profile. Simply allowing a cheating player to create a new player profile and continue playing may not be a sufficient deterrent to cheating. Thus, according to example embodiments, if a new player profile can be linked to a previously banned player profile, the new player profile may be penalized during game play with a severity commensurate with a number of times related player profiles have been found to be cheating. As a result, a cheating player may not be able to escape repercussions of cheating simply by creating a new player profile when a previous player profile is banned from online game play due to detection of cheating by use of a bot. In this way, cheating may be reduced, thereby enhancing fairness in online game play and providing a more enjoyable game playing experience for non-cheating players.

Example embodiments of the disclosure provide a mechanism for detecting links between a player profile and a player profile that has cheated before. This linkage may be used to impart penalties on player profiles linked to player profiles with a prior record of bot usage during online game play. A player profile may be linked to another player profile by comparing one or more of network address(es) and/or device identifiers. For example, if a new player profile is found to be using a client device for online game play having a device identifier that matches a previous player profile that had engaged in bot use, then it may be determined that the new player profile is linked to that previous player profile that had cheated before. It is possible that the player associated with the new player profile may cheat using the new player profile.

When a player profile is found to be cheating during online game play, that player profile may be stored in a player profile datastore associated with network address(es) from which the player profile had interacted with the online gaming system and/or device identifiers for their client devices or portions thereof. If a player profile is found to share a network address, such as an internet protocol (IP) address, and/or the one or more device identifiers with another player profile, then the two player profiles may be found to be linked. Furthermore, if the other player profile is a banned player profile and was previously found to have cheated, then game play penalties may be enforced against the linked new player profile. The newer linked player profile may not be banned from online game play, but it may be disadvantaged relative to other player profiles of other players playing the online game via the online gaming systems.

The network address(es) that may be logged for player profiles caught cheating and/or may be used to determine player profiles linked to other player profiles may be of any suitable type, such as an IP address, a media access controller (MAC) address, an ethernet hardware address (EHA), host name, host identifier, combinations thereof, or the like. The one or more device identifiers that may be logged for player profiles caught cheating and/or may be used to determine player profiles link to other player profiles may be of any suitable type, such as any type of hardware identifier associated with the client device, or portions thereof, from which the player profile accesses the online game as hosted by the online gaming system. These device identifiers may include universally unique identifiers (UUID), globally unique identifier (GUID), mobile equipment identifiers (MEID), processor unique identifier, storage device unique identifier, input/output (I/O) device unique identifier, phone number, or any other identifier linked to the processor, storage, memory, display, interfaces, or any other suitable components of a client device, etc.

According to example embodiments, if a period of time (e.g., 30 days, 2 weeks, etc.) transpires where a penalized player profile had not been caught cheating, then game play penalties imparted on that player profile may be removed or diminished. Thus, a player who had cheated may create a new player profile where he or she is penalized, but after a period of time without cheating may be allowed to play the online game without any penalties. In this way, if a player's client device or portion thereof (e.g., client device's hard drive) is sold or transferred to someone else who wishes to play the online game, the new player may be linked to the previous cheating owner of the hardware and therefore penalized during online game play, but after a certain period of time without cheating, may be cleared for online game play without any penalties. Additionally, if a player reforms his or her ways and decides to give up cheating, then he or she may be able to engage in online game play after the period of time.

As discussed by way of example above, when a new player profile is created and is linked to a previous player profile that had been banned for cheating, the new player profile may again engage in cheating. If this happens, then future linked player profiles may be subjected to greater severity of online gaming penalties. For example, there may be five different levels of severity, where the lowest level may implement a single penalty with relatively low severity for cheating. As additional linked player profiles are found to be cheating (e.g., a chain of linked cheating player profiles), the level of severity of penalties may be ratchetted up through levels two, three, four, and ultimately level five. At the severity level five, there may be high impacts of multiple forms of penalties imposed on the player profile. These penalties at the highest level of severity of penalties may make online game play from by the penalized player profile highly undesirable and may put the penalized player profile at a significant disadvantage even with cheating.

Penalties that may be imposed on a player profile that is linked to another player profile that was previously caught cheating may include any suitable penalty with any suitable severity. One type of penalty may include disabling one or more functions on the client device side of game play. For example, in shooting games, whether a shot was on target (e.g., hitting an opponent) may normally be determined in cooperation between the client device of the player and the online gaming system. In a normal situation without penalties, a client device of the player profile may provide a hit assertion and/or damage from a hit to the online gaming system. However, if a player is cheating by using a bot, the bot may provide erroneous data that favors the cheating player when determining the targeting of a shot and/or damage resulting from the shot. Therefore, one penalty imparted on a player profile (e.g., a player profile linked to a previously cheating player profile) may be to suspend cooperative shot and/or damage determinations and all determinations of whether a potential shot was on target may be performed by the online gaming system hosting the online game. If a hit assertion is provided by the client device, the hit assertion may be ignored by the online gaming system. The online gaming system may instead make an independent assessment of a potential hit, such as whether the potential hit actually hit the target and/or what damage the hit imparted. This penalty may be called server-side hit determination.

Another penalty that may be imposed on a player profile may include reducing and/or removing any compensatory benefits for players having high levels of latency in their network connections with the online gaming system relative to other players. Under normal game play without any penalties, the player profiles that have a high level of latency in their network connections relative to latency experienced by other players may be given benefits to compensate for the slower network connection. For example, latency compensation may include removing latency, in a manner such that an event may be assessed based on what the player saw on his or her display. In other words, the latency compensation may involve moving back in time with respect to the game state to assess a particular event. For example, if a player's avatar shot another player's avatar, the assessment of whether the shot was on target and/or the damage of the shot may be determined by moving the game state back by a certain amount of time that may be related to the level of latency compensation provided to the player.

If a player is to be penalized by removing latency compensation, then latency compensation benefits may be removed for that player's player profile. Furthermore, greater severity of penalties may include adding latencies on to the player profile beyond removing latency compensation. For example, a normal latency compensation may be 5 milliseconds (ms) for a particular player based on his or her network latency. In other words, the assessment of an event may be made based on a game state 5 ms prior. This latency compensation may be provided to the player because this player may be playing using a slow network connection to the online gaming system. If the player is to be penalized for being linked to a player profile that had previously cheated using a bot, the player's 5 ms latency compensation may be removed. In other cases, some, but not all, of the latency compensation (e.g., 3 ms of 5 ms) may be removed. If this player is caught cheating again, then the player's player profile may be banned and if another player profile is created that can be linked to the player (e.g., by device identifiers and/or IP address), then that new player profile may be penalized with even greater levels of latency compensation removal. Additionally, in some cases, latency may be added, such as by adding 5 ms of latency so that events may be assessed by adding time to the time of the current game state. In this way, latency compensation benefits and/or overall latency may be modified for player profiles for the purposes of penalizing the player associated with the player profile.

According to example embodiments, another form of penalty for a player profile may include decreasing damage from a hit. For example, in a shooting game, damage from a gunshot to an opponent may be reduced by 20% as a penalty for being linked to a player profile that had previously been found to be cheating. The severity of the decreased damage from a hit may be increased with increasing levels of severity of player penalty. For example, at a lower severity, damage in a boxing game from punching an opponent may be decreased by 10% at a relatively low level of severity of penalty, while the damage may be decreased by 70% at a relatively high level of severity of penalty. This type of reduction of damage from a hit may be referred to as damage scaling, where an amount of determined damage under normal game play may be scaled down by a scaling factor by the online gaming system for the player profile.

Example embodiments may further include penalties on player profiles that drop one or more intended moves of a player profile to disadvantage that player relative to other players playing an online game hosted by the online gaming system. For example, 10% of a player's intended moves may be dropped, or otherwise not performed on behalf of the player in the online game, as hosted by the online gaming system. In this case, every tenth move that the player wishes to make may be dropped or otherwise not performed. As the severity of the penalties applied to player profiles are increased, a greater proportion of intended moves may be dropped. For example, at a low level of severity of penalties, 20% of moves may be dropped, while at a high level of severity of penalties, 60% of moves may be dropped.

Although penalties to disadvantage a player profile for being linked to a cheating player profile is discussed herein in the context of server-side hit detection, latency penalty in the form of removing and/or reducing latency compensation and/or adding latency, damage scaling, and/or dropped moves, it should be appreciated that other suitable actions may also be employed to penalize a player account according to example embodiments of the disclosure. For example, a smaller hit box of opponents, or otherwise a smaller area where an impact may be adjudicated as a hit rather than a miss, may be implemented for a penalized player profile. This smaller hit box, such as in a shooting game, may make it harder to shoot a target than if the hit box were larger.

Detecting online game players who are cheating in online games by using bots may be performed by any suitable mechanism. The bots may engage with one or more application programming interfaces (APIs) of the online gaming system(s). According to example embodiments of the disclosure, API interactions by a game player's client device may be used by the online gaming system to determine whether that player is using a bot. When a player is found to be cheating by using bots, that player's player profile may be banned and recorded so that subsequent linked profiles may be identified and disadvantaged (e.g., client-side functions disabled, slowed down, functions dropped, access paused, etc.) for a certain period of time.

Bot use by a player profile may be detected in some example embodiments by identifying super-human activities and/or speed in interacting with the online game. In some cases, a bot may provide an advantage to player who chooses to cheat by using the bot due to the speeds at which the bot can operate and/or the number of processes that the bot can handle simultaneously compared to a human player. In some cases, the speeds of operations and/or the parallel processing of a player profile may be identified as super-human, or otherwise unlikely to result from human game play. As a result, these player profiles may be exposed as using a bot during game play. Super-human speeds and/or super-human activities during online game play may be determined by analyzing API data and/or frequency of API calls during game play.

In some example embodiments, bot use may be detected by a tripwire mechanism. The use of a tripwire may involve changing APIs to include decoy parameters and determining if a particular player profile attempts to access a decoy parameter of an API. If a player profile attempts to access an API parameter that is not supposed to be accessed or does not populate an API parameter when it is to be specified, then that player profile may be determined to be using a bot. For example, a decoy parameter that is not to be accessed may be added to a particular API and any player profile that accesses that decoy parameter may be identified as using a bot. Similarly, changes may be implemented so that a new parameter in a particular API is to be accessed and any player profile that does not access that parameter may be identified as using a bot. As a result, bot-driven interactions may access portions of the API that are not to be accessed or not access portions of the API that are to be accessed. In this way, API calls may be analyzed to determine if a particular player profile is using a bot.

Other forms of cheating may also be detected by determining which APIs are accessed by a particular client device linked to a particular player profile. For example, if a player profile accesses information that would otherwise not be available to it, the client device with software running thereon associated with the player profile may make API calls for information that would not normally be provided to the player associated with the player profile. Thus, the detection of certain API calls may indicate cheating by a particular player profile.

Cheating where incorrect assessments of events (e.g., hit or damage assessments) are passed to the online gaming system from the cheating player's client device may be determined by independent assessment of the events by the online gaming system. For example, if the online gaming system does a spot check of a magnitude of damage to an opposing player profile from a gunshot in a shooting game and detects that the assessment from the client device is inflated, then the online gaming system may identify cheating by the associated player profile.

As discussed herein, example embodiments of the disclosure may be used to control cheating in a variety of different online games, such as shooter games, individual sports games, fighting games, team sports games, simulation games, racing games, building games, combinations thereof, or the like. Although examples in the realm of video games and online gaming are discussed herein, it should be understood that the cheating detection mechanisms and cheating penalization mechanisms, as described herein, may also be applied to any variety of online interactions. Indeed, without providing an exhaustive list of applications, the penalization techniques, as discussed herein, may be applied to any suitable type of online commerce, online competitions, online sales, online education, social media interactions, etc.

It should be understood that the systems and methods, as discussed herein, are technological improvements in the field of online interactions and online gaming. For example, the methods and systems as disclosed herein enables computing resources to improve online gaming for players by preventing cheating and/or reducing cheating by some players. These improvements manifest in accuracy, precision, automation, efficiencies, thoroughness, speed, objectivity, and repeatability over traditional mechanisms of controlling cheating in online interactions. Indeed, the disclosure herein provides improvements in the functioning of computers to provide improvements in the technical field of online gaming and the prevention of cheating. The anti-cheating mechanisms as discussed herein are inherently linked to computing systems and cannot be performed as a human activity.

This type of cheating prevention, as discussed herein, cannot be performed by prior traditional methods without the use of linking player profiles to prior player profiles that had been caught cheating. Furthermore, the mechanisms and systems discussed herein, provide objective and repeatable action for player profiles linked to players who may have cheated before. Additionally, the technological problems addressed here are ones that arise in the computer-era and the Internet-era, such as in the fields of online gaming. Thus, not only is the disclosure directed to improvements in computing technology, but also to a variety of other technical fields related to online gaming.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with online gaming system(s) 110 to enable online gaming via client device(s) 104 and disadvantaged interactions, in accordance with example embodiments of the disclosure. The example environment 100 may include one or more player(s) 102(1), 102(2), ... 102(N), hereinafter referred to individually or collectively as player 102 or player(s) 102, who may interact with respective client device(s) 104(1), 104(2), ... 104(N), hereinafter referred to individually or collectively as client device 104 or client device(s) 104.

The client devices 104 may be configured to render content associated with the online game to respective players 102. This content may include video, audio, haptic, combinations thereof, or the like content. The client device(s) 104 may receive game state information from the one or more online gaming system(s) 110 that may host the online game played by the player(s) 102 of environment 100. The receiving of game state information and/or parameters may be via one or more application program interfaces (APIs) 120 of the online game being hosted by the online gaming systems 110. The APIs 120 may include any suitable number of APIs 122, 124, 126, 128.

The client device(s) 104 may use the game state information to render current events of the online game as content. The game state information may be received by the client device(s) 104 repeatedly and/or continuously and/or as events of the online game transpire. The game state information may be based at least in part on the interactions that each of the player(s) 102 have via their client device(s) 104 responsive to events of the online game hosted by the game system(s) 110.

As events transpire in the online game, the game system(s) 110 may update game state information and send that game state information to the game client device(s) 104. For example, if the players 102 are playing an online soccer game, and the player 102 playing one of the goalies move in a particular direction, then that movement and/or goalie location may be represented in the game state information that may be sent, via the APIs 120, to each of the client device(s) 104 for rendering the event of the goalie moving in the particular direction. In this way, the content of the online game is repeatedly updated throughout game play. When the game client device(s) 104 receive the game state information from the game system(s) 110, the game client device(s) 104 may render updated content associated with the online game to its respective player 102. This updated content may embody events that may have transpired since the previous state of the game (e.g., the movement of the goalie).

The client device(s) 104 may accept input from respective players 102 via respective input device(s) (e.g., joysticks, touchscreens, etc.). The input from the players 102 may be responsive to events in the online game. For example, in an online basketball game, if a player 102 sees an event in the rendered content, such as an opposing team's guard blocking the paint, the player 102 may use his/her input device to try to shoot a three-pointer. Intended action by the player 102, as captured via his/her client device 104 may be sent to the game system(s) 110 as parameters via the APIs 120 by the client device making API calls. Thus, the API calls via the APIs 120 allow the client devices 104 to send parameters representing player 102 actions to the online gaming system 110. The API calls by the client device made on behalf of a player (e.g., a player account of the player 102) may be made to any available API 122, 124, 126, 128 of the online game being hosted by the online gaming system 110.

The client device(s) 104 may be any suitable device, including, but not limited to a Sony Playstation® line of systems, a Nintendo® handheld line of systems, a Microsoft Xbox® line of systems, any gaming device manufactured by Sony, Microsoft, Nintendo, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 104 may execute programs thereon to interact with the game system(s) 110 and render game content based at least in part on game state information received from the game system(s) 110. Additionally, the client device(s) 104 may send indications of player input (e.g., player intended actions) to the game system(s) 110. Game state information and player input information and/or parameters may be shared between the game client device(s) 104 and the game system(s) 110 using the APIs 120.

The client devices 104 of a player profile caught cheating may be identified and then information about that client devices 104 may be used to determine other player profiles that are linked to the player profile caught cheating. This information about the client device 104 may be of any suitable type, such as an IP address, a media access controller (MAC) address, an ethernet hardware address (EHA), host name, host identifier, universally unique identifiers (UUID), globally unique identifier (GUID), mobile equipment identifiers (MEID), processor unique identifier, storage device unique identifier, input/output (I/O) device unique identifier, phone number, or any other identifier linked to the processor, storage, memory, display, interfaces, or any other suitable components of a client device 104, etc.

The game system(s) 110 may receive inputs (e.g., parameters representative of player inputs) from various players 102 via API calls to the APIs 120 and update the state of the online game based thereon. As the state of the online game is updated, the state information and/or updates may be sent the various client system(s) 104 for rendering online game content to players 102. In this way, the game system(s) 110 host the online game.

The online gaming system 110 when hosting an online game among one or more players 102 with their player accounts on their respective client devices 104 may be configured to generate API data 130. This API data may include API data 132, 134, 136, 138 of the individual APIs 122, 124, 126, 128, respectively, of the online game being hosted by the online gaming system 110. The API data 130 may include the parameters that are associated with API calls made by the client devices 104. The API data 130 may also include timestamps and/or identifying information associated with the client device 104 and/or the player 102 with whom the API data 130 is associated. Additionally, device identifiers of the client devices 104 and/or network addresses associated with the client devices 104 may be received along with, or as part of, the API data 130.

If a bot is used by a particular player 102 on his or her client device 104 to cheat in playing an online game hosted by the online gaming system(s) 110, then the bot may interface with the APIs 120 of the online game. The bot may react to the online game directly via the APIs 120. In this way, the bot may play the online game or portions thereof, rather than the player 102 who is supposed to be playing the online game. When the state of the online game changes (e.g., an opponent makes a move, resources are made available, etc.), the bot may react to the state of the online game rather than the human player 102 reacting to the state changes in the online game. Since a bot may be able to react to state changes of an online game faster and/or more effectively than a human, the use of a bot may provide an unfair advantage for the player 102 who cheats by using the bot. Other mechanisms of cheating (e.g., obtaining normally hidden information, erroneous event assessments, etc.) may be determined by detecting and/or analyzing API data 130.

A bot or the use of other cheating mechanisms may leave fingerprints when interacting with the APIs 120 that may be detected, such as by analyzing the API data 130. For example, a bot may make moves at super-human speeds at which a human player 102 would not be able to react to changes in game state. Such actions may be detected on the online gaming system 110 side and identified as a bot. Another way to detect bot use may be to present changes in the APIs such that parameters may be used (e.g., elements of the API may be accessed) that would otherwise not be accessed by non-bot assisted game play. These types of detection mechanisms that use changes in API parameters and/or decoy API parameters may be referred to as tripwires.

The API data 130 may be analyzed by the online gaming system(s) 110 to detect cheating by a player profile associated with a player 102. When a player profile 150 is identified as cheating, such as by using a bot, accessing normally hidden information, making erroneous event assessments, or the like, the player profile 150 may be banned from further game play. Additionally, a player profile 150 identified as cheating by bot usage may be logged in a player profile datastore 140. In the player profile datastore, the player profile 150 may be stored indicating a network address 152 from which the player profile accesses the online gaming system 110, one or more device identifier(s) 154, a penalty level 156 related to the severity of penalties to be imparted on any linked accounts, and/or a cheating timestamp 158 indicating when the bot use was identified for the player profile 150.

The online gaming system 110 may host the online game and further implement cheating detection 160 by way of any suitable mechanism, such as detecting super-human actions and/or timing, by use of tripwires, independent assessment of client-side event assessments, analyzing non-standard API calls, or the like. The online gaming system 110 may further be configured for hardware identifier(s) and/or network address detection 162 of the player profiles 150 and associated client devices 104. The network address and/or hardware identifiers of the client device 104 may be detected based at least in part on one or more data packets received from the client device 104 associated with a player profile 150. Packet inspection may be performed to identify the network address and/or hardware identifier(s). As discussed herein, the network addresses may include any suitable network address, such as an IP address, a MAC address, an EHA, a host name, a host identifier, combinations thereof, or the like. Similarly, the device identifiers may include a UUID, a GUID, a MEID, a processor unique identifier, a storage device unique identifier, an I/O device unique identifier, phone number, or any other identifier linked to the processor, storage, memory, display, interfaces, or any other suitable components of a client device, etc. The detected network addresses and/or device identifiers may be stored in association with a player in a player profile 150 on the player profile datastore 140, such as when cheating has been detected for the player profile 150.

The online gaming system 110 may further be configured to perform server-side hit detection 164. As described herein, the server-side hit detection 164 may cause the online gaming system 110 to receive hit information (e.g., bullet trajectory, punch direction, kick force, etc.) and determine whether a hit (e.g., an on-target shot, a punch that landed, a kick that connected, etc.) occurred and a corresponding magnitude of the hit (e.g., damage caused, distance moved, etc.). In this case, the server-side hit detection 164 may be performed entirely by the online gaming system 110 based at least in part on initial API data 130 corresponding to an action, rather than as a cooperation between the client device 104 and the online gaming system 110. Any hit assertions (e.g., that a target was hit or a certain amount of damage was imparted, etc.) received from the client device 104 may not be used by the online gaming system 110 and the online gaming system 110 may make an independent assessment of a potential hit. In this way, any manipulation and cheating in indicating a hit when there was no hit or indicating a greater magnitude of a hit than what the magnitude should be on the client may be avoided. In some example embodiments, server-side hit detection 164 may be implemented at a lowest level of severity of online game play penalty.

The online gaming system 110 may be configured to add latency penalty 166 to actions performed by player profiles that are to be penalized with latency penalties. As described herein, the latency penalty may either subtract compensatory latency benefits and/or add punitive latency to actions when assessing the outcome of an event. A player profile 150 may normally be given compensatory latency reduction benefits if the client device 104 associated with that player profile 150 is connecting to the online gaming system 110 using a relatively slow network connection. Thus, latency penalties in the form of removal of compensatory latency benefits and/or adding latency can disadvantage the layer profile and, therefore, may be used as a punitive measure to deter players 102 from cheating, such as by bot use. If a player is to be penalized by latency penalty 166, there may be levels of severity of the latency penalty 166. For example, a lowest level of severity of latency penalty may be to remove latency compensation. A higher level of severity of latency penalty may be to add additional latency to online game actions fort eh player profile after already taking away any compensatory latency benefits. Furthermore, the magnitude of latency addition to actions by the player profile may be increased for greater levels of severity of latency penalties 166.

The online gaming system 110 may be configured to provide damage scaling 168 as a mechanism to penalize a player profile that has been linked to another player profile that had been caught cheating. Damage scaling 168 may reduce, such as by a percentage, the damage inflicted by a particular action. For example, the damage inflicted by a player profile shooting another player profile may be reduced to 80% of what it would be if damage scaling 168 is not implemented for the player profile. According to example embodiments, the magnitude of damage scaling 168 may be increased with increasing severity of penalties to impart on a player profile. For example, a lower level of severity of damage scaling 168 may use a 90% damage scaling factor, while a high level of severity of damage scaling 168 may use a 40% damage scaling factor.

The online gaming system 110 may further be configured to implement dropped moves 170 as a mechanism to penalize a player profile that has been linked to another player profile that had been caught cheating. Dropped moves 170 may drop one or more intended moves that a player 102 may wish to make. Dropping moves can disadvantage a player profile during online game play because certain intended moves (e.g., a percentage of intended moves) of the player profile may not be implemented. Sometimes dropped moves 170 may be referred to as rubber-banding, because when intended moves are dropped, avatars in an online game may appear to be held in place by a rubber band. According to example embodiments, the magnitude of dropped moves 170 may be increased with increasing severity of penalties to impart on a player profile. For example, a lower level of severity of dropped moves may drop 10% of the player's moves, while a high level of severity of dropped moves may drop 50% of the player's moves.

Figure 2A:
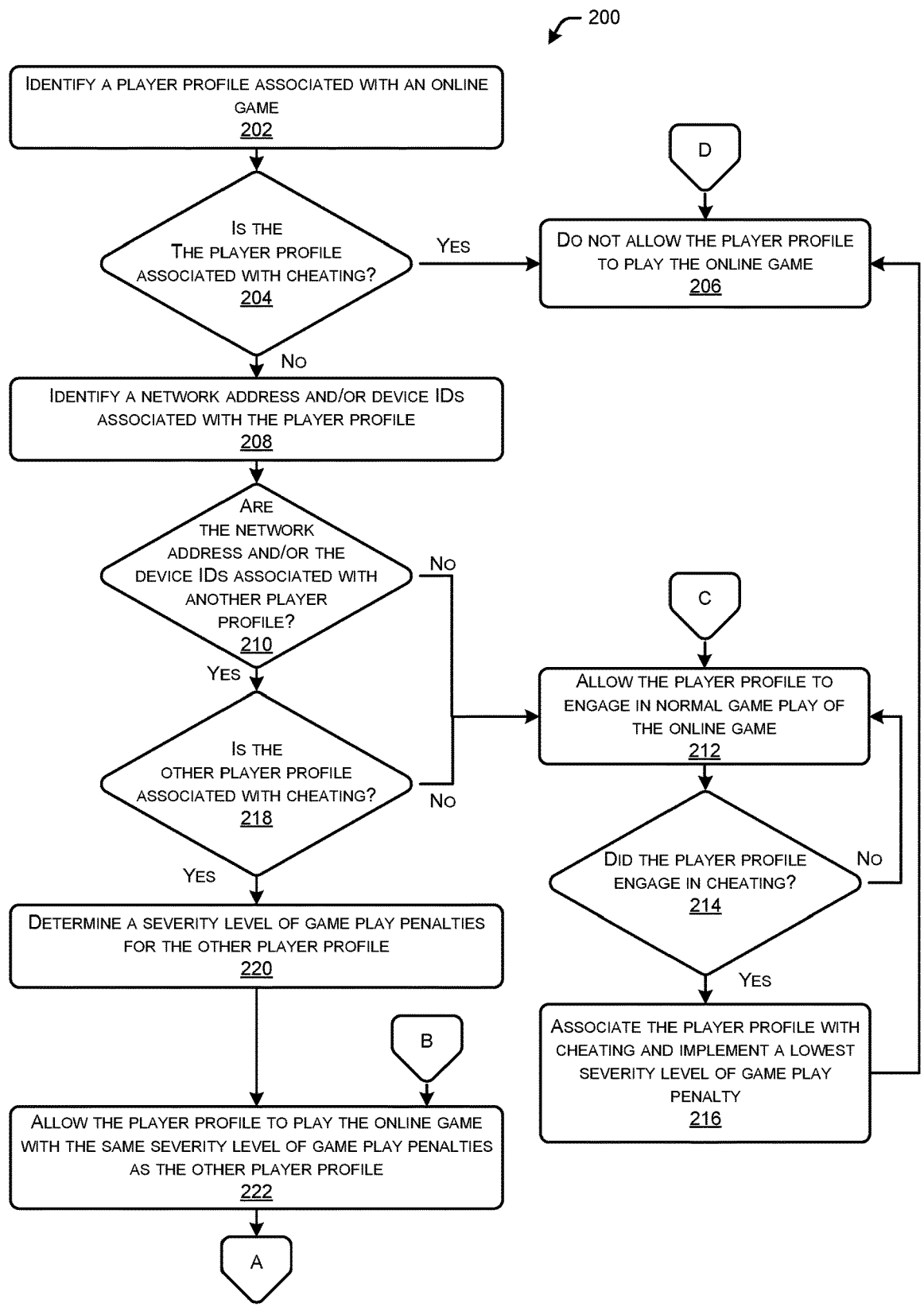
FIGS. 2A and 2B illustrate an example flow diagram of a method by which penalized game play may be implemented by the online gaming system(s) that host an online game, in accordance with example embodiments of the disclosure.
Figure 2B:
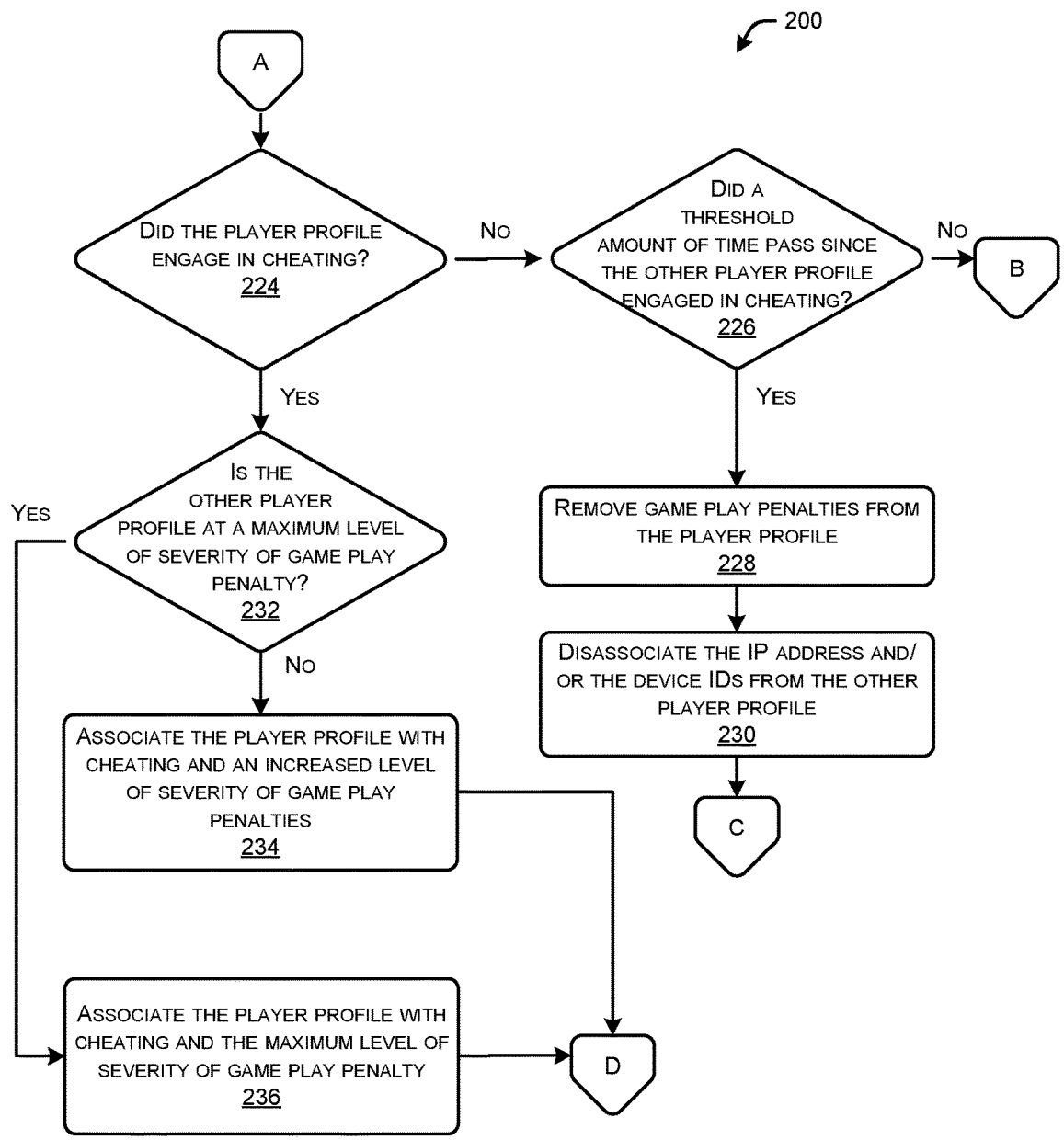

FIGS. 2A and 2B illustrate an example flow diagram of a method by which penalized game play may be implemented, in accordance with example embodiments of the disclosure. The method 200 may be performed by the online gaming system(s) 110, individually or in cooperation with one or more other elements of the environment 100.

At block 202, a player profile associated with an online game may be identified. The player profile may include an indication of one or more network addresses associated with the player 102 associated with the player profile. The network addresses may be the network addresses from which a client device 104 associated with the player profile may access the online gaming system 110 to player the online game. The player profile may further include an indication of one or more device identifiers associated with the client device 104 with which the player profile accesses the online gaming system 110 to player the online game. In example embodiment, the player profile may attempt to access the online game on the online gaming system 110.

At block 204, it may be determined whether the player profile is associated with cheating. This may be determined by the online gaming system 110 by accessing the player profile datastore 140 to determine if the player profile is stored in the player profile datastore indicating that the player profile had cheated before. If it is found that the player profile is associated with cheating, then the player profile may be banned from playing the online game, and at block 206, the player profile may not be allowed to play the online game. If, however, at block 204, it is determined that the player profile is not associated with cheating, then the method 200 may proceed to block 208. At this point, the player profile may either have played the online game before and not been caught cheating, or the player profile is a newly created player profile that has not previously played the online game.

At block 208, the network address and/or the device identifiers associated with the player profile may be identified. As described herein, the network address and/or the device identifiers may be determined by inspecting the communications packets received from the client device 104 from which the player profile attempts to access the online game, as hosted by the online gaming system 110. The network addresses may include any suitable network address, such as an IP address, a MAC address, an EHA, a host name, a host identifier, combinations thereof, or the like. Similarly, the device identifiers may include a UUID, a GUID, a MEID, a processor unique identifier, a storage device unique identifier, an I/O device unique identifier, phone number, etc.

At block 210, it may be if the network address and/or the device identifiers are associated with another player profile. This may be determined by comparing the network address and/or the device identifiers to other player profiles that may be stored in a database, such as the player profile datastore 140. The player profile datastore 140, in example embodiments, may store player profiles in association with their respective network address(es) and/or device identifiers. In this way, any match between the player profile's network address and/or device identifier and another player profile's network address and/or the device identifiers may be determined. If it is determined at block 210 that the player profile is not linked to another player profile by way of having a matching network address and/or device identifier with another player profile, then the method 200 may proceed to block 212, where the player profile may continue to be allowed to engage in normal game play.

At block 212, the player profile may be allowed to engage in normal game play of the online game. In other words, the player profile may be allowed to play the online game without any penalties implemented during online game play. In this case, the player profile has not, at least yet, been found to cheat and is not linked to any player profile that had been found to cheat.

At block 214, it may be determined if the player engaged in cheating during online game play. As discussed herein, any suitable mechanism may be used for determining if the player profile has engaged in cheating, such as by monitoring for super-human speeds of actions and/or by using tripwire methods, or the like. If it is determined that the player profile has not engaged in cheating, then the method 200 may return to block 212 to continue to engage in normal game play.

If, on the other hand, it is determined at block 214 that the player profile has engaged in cheating, then at block 216, the player profile may be associated with cheating and implementation of a lowest severity level of game play penalty. This association may be made to the player profile as stored on the player profile datastore 140. The method 200 may then proceed to block 206, where the player profile may no longer be allowed to play the online game.

At block 210, if it is found that the player profile is linked to another player profile by way of a matching network address and/or device identifiers, then at block 218 it may be determined whether the other player profile is associated with cheating. This association can be determined by accessing the other player profile in the player profile datastore 140 and identifying whether the other player profile is indicated to have cheated. If the other player profile is not associated with cheating, then the method 200 may proceed to block 212 where the player profile may be allowed to engage in normal game play without any penalties imposed thereon. Additionally, the player profile may be checked for cheating at block 214 and either allowed to continue normal game play at block 212 if no cheating is detected or associated with cheating and a lowest severity level of game play penalty at block 216.

If at block 218, it is found that the other player profile had been associated with cheating, then at block 220 it may be determined what severity level of game play penalties are associated with the other player profile. As discussed herein there may be any number of levels of severity of player penalties. As a non-limiting example, there may be a six level hierarchy of implementing penalties on a player profile. These various levels of severity may be related to how many times a new payer profile has been linked to a prior player profile that had been caught cheating. In other words, a chain of linked player profiles, where each subsequent player profile has continued to cheat, may result in an increase in the level of severity of penalties every time a new linked player profile is caught cheating, until a maximum level of severity of penalty is reached. Each of the different levels of severity of the player penalties may implement one or more of the server-side hit detection 164, latency penalty 166, damage scaling 168, dropped moves 170, or any other form of player penalty, each with any suitable magnitude of severity.

At block 222, the player profile may be allowed to play the online game with the same severity level of game play penalties as the other player profile. Thus, the mix of penalties that correspond to the severity level of game play penalties may be applied to the player profile during online game play by the player profile.

At block 224, it may be determined if the player profile engaged in cheating. If it is determined that the player profile did not engage in cheating, then at block 226, it may be determined if a threshold amount of time passed since the other player profile engaged in cheating. This passage of time may be determined from a timestamp as associated with the other player profile stored in the player profile datastore of when the other player profile was caught cheating. This threshold amount of time may be any suitable time over which a lack of cheating may result in the player profile earning back the privilege to playing the online game without penalties. Example of the threshold time may be a month, a fortnight, 10 days, 30 days, 60 days etc.

If it is determined that the threshold amount of time has indeed transpired without the player profile cheating, then at block 228, game play penalties may be removed from the player profile. This may allow the player profile to engage in normal online game play without any penalties. At block 230, the player profile may be disassociated with the other player profile. This may be accomplished by removing the network address(es) and/or the device identifier(s) of the other player profile in the player profile datastore 140. In this way, the current player profile may no longer be associated with a previous player profile that has cheated. At this point, the player profile may engage in normal game play of the online game at block 212 and may continue to be monitored for cheating with any repercussions associated therewith according to the processes blocks 214 and 216.

If at block 226 it is determined that the threshold amount of time had not yet transpired, then the method 200 may return to block 222, where the player profile may be allowed to continue to play the online game with the same severity level of game play penalties as the other player profile.

If at block 224 it is determined that the player profile did engage in cheating, then the method may proceed to block 232 where it may be determined if the other player profile is at a maximum level of severity of game play penalty. If it is determined that the other player profile is not at a maximum level of severity of player penalty, then at block 234, the player profile may be associated with cheating and an increased level of severity of game play penalties. This association may be made in the player profile datastore 140. Thus, if a new player profile is found later on to be linked to this player profile, then that later profile will be allowed to play the online game at a greater level of severity of game player penalties than the current player profile. The method may then proceed to block 206, where the player profile is no longer allowed to play the online game. If at block 232 it was found that the other player profile is already at the maximum level of player penalties, then the method may proceed to block 236. At block 236, the player profile may be associated with cheating and the highest level of severity of player penalties, such as in the player profile datastore 140. Next, the player profile may be blocked from online game play at block 206.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

FIG. 3 illustrates a chart illustrating an example hierarchy 300 of penalties and penalty severity levels, in accordance with example embodiments of the disclosure. This is one example of a hierarchy 300 having eight levels of severity where one level is no penalties placed on a player profile. It should be understood that any suitable hierarchy may be implemented with any suitable number of levels and magnitude of progression of various penalties, in accordance with example embodiments of the disclosure.

As shown here there may be a trusted level of game play where there may be no penalties imposed on a player profile. This level may be implemented on player profiles that are either not linked to other player profiles that have cheated or to player profiles for which a threshold amount of time has passed without any cheating. A lowest level of severity of penalty may include implementing server-side hit 164 detection. The implementation of server-side hit detection may prevent interfacing with the APIs 120 to erroneously indicate a hit by the player profile when there is none or erroneously inflate the damage resulting from a hit.

A second level of severity of player penalties may be implemented when a player profile is linked to a preceding player profile that had cheated and has also been linked to a prior player profile that had cheated. At the second level of severity of player penalty, in addition to the server-side hit detection 164, latency penalty 166 in the form of removal of latency compensation and/or latency addition may be implemented for online game play for the player profile. A third level of severity of player penalties may be implemented for a player profile having a chain of three prior player profiles that had cheated. At the third level, damage scaling 168 may be implemented on the player profile with a magnitude of 80%. This damage scaling may be added in addition to the penalties implemented at the second level of severity of penalties on the player profile. A fourth level of severity of the player penalty, which may be implemented on a player profile that is linked to a chain of four prior player profiles that have cheated during game play, may include a greater magnitude of 60% scaling for damage scaling 168, in addition to the server-side hit detection 164 and the latency penalty 166.

A fifth level of severity of the player penalty, which may be implemented on a player profile that is linked to a chain of five prior player profiles that have cheated during game play, may introduce dropped moves 170 in addition to damage scaling 168 at 60%, the server-side hit detection 164, and the latency penalty 166. A sixth level of severity of the player penalty, which may be implemented on a player profile that is linked to a chain of six prior player profiles that have cheated during game play, may increase the magnitude of the dropped moves to 20% of moves, in addition to damage scaling 168 at 60%, the server-side hit detection 164, and the latency penalty 166. A seventh and highest level of severity of the player penalty, which may be implemented on a player profile that is linked to a chain of seven prior player profiles that have cheated during game play, may increase the magnitude of the dropped moves to 33% of moves, in addition to increasing damage scaling 168 to 40%, while implementing the server-side hit detection 164 and the latency penalty 166.

Figure 4:
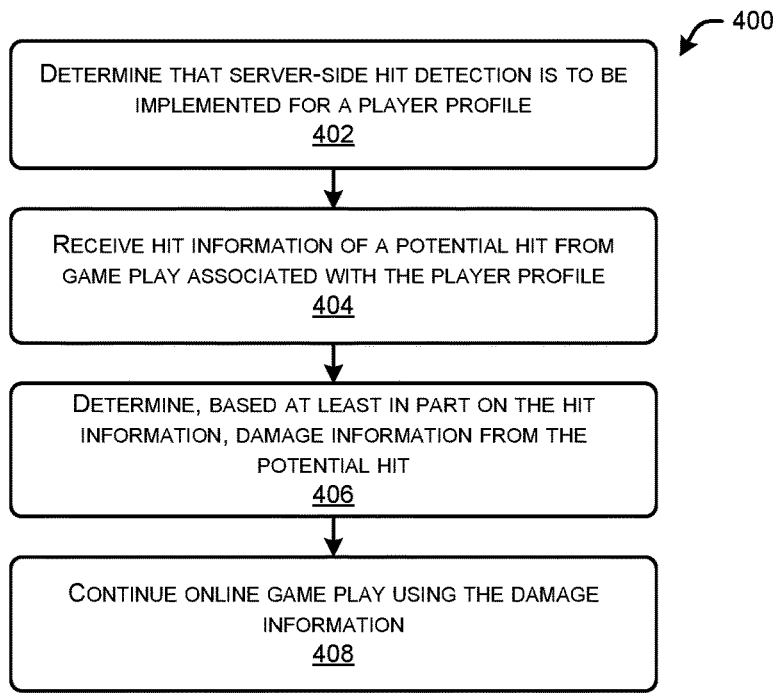
FIG. 4 illustrates a flow diagram of an example method for server-side hit detection, in accordance with example embodiments of the disclosure.

FIG. 4 illustrates a flow diagram of an example method 400 for server-side hit detection, in accordance with example embodiments of the disclosure. The method 400 may be performed by the online gaming system(s) 110, individually or in cooperation with one or more other elements of the environment 100. The method 400 may be an example process performed as part of implementing a game play penalty on a player profile, such as in the operations of blocks 222 of method 200 of FIGS. 2A and 2B.

At block 402, it may be determined that server-side hit detection is to be implemented for a player profile. This determination may be based at least in part on determining a level of severity of game play penalty to be imposed on a player profile and then identifying that that level of severity includes implementing server-side hit detection.

At block 404, hit information associated with a potential hit from game play by the player profile. This hit information may include the trajectory of an object and/or projectile (e.g., bullet, fist, foot, ax, etc.) and magnitude of the trajectory. For example, this information may encompass a physical vector in an online game space. Additional hit information may include the location of other player avatars (e.g., the player avatar that is to be hit) in the online game space.

At block 406, damage information from the potential hit may be determined based at least in part on the hit information. This process may take into account the trajectory of the object and/or projectile and make a determination of whether the object and/or projectile traverses a hit box of the opposing player's avatar in the online game space. Additionally, an assessment may be made of how direct, such as within the hit box, any potential hit is, as well as the magnitude of the motion of the object and/or projectile. If the object and/or projectile does not contact the hit box of the opposing player's avatar in online game space, then there may be a determination that no hit was made and there would be no damage to the opposing player profile. On the other hand, if the object and/or projectile does intersect the opposing player profile's hit box, then it may be determined that there was a hit and further information (e.g., position of the hit within the hit box, magnitude of motion of the object and/or projectile in online game space, mass of the object and/or projectile in online game space, etc.). In this way, any client device assertions of a hit may be ignored and/or independently verified by the online gaming system 110. In cases where damage scaling is also implemented on the player profile, any determination of damages imparted from a potential hit may further be scaled by a scaling factor of the damage scaling. At block 408, online game play may be continued using the damage information on the opponent player profile resulting from the potential hit.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
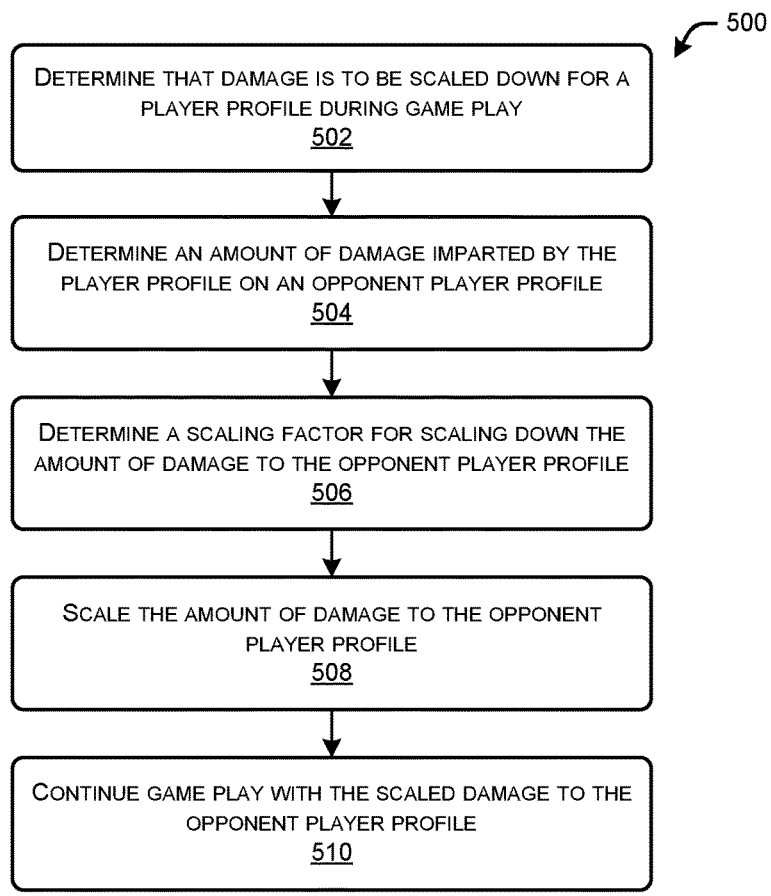
FIG. 5 illustrates a flow diagram of an example method for scaling damage on an opposing player profile, in accordance with example embodiments of the disclosure.

FIG. 5 illustrates a flow diagram of an example method 500 for scaling damage on an opposing player profile, in accordance with example embodiments of the disclosure. The method 500 may be performed by the online gaming system(s) 110, individually or in cooperation with one or more other elements of the environment 100. The method 500 may be an example process performed as part of implementing a game play penalty on a player profile, such as in the operations of blocks 222 of method 200 of FIGS. 2A and 2B.

At block 502, it may be determined that that damage scaling is to be implemented for a player profile. This determination may be based at least in part on determining a level of severity of game play penalty to be imposed on a player profile and then identifying that that level of severity includes implementing scaling down damage by the player profile. In example embodiments, the level of severity of game play penalty may also indicate a magnitude of damage scaling to be implemented on the player profile.

At block 504, an amount of damage imparted by the player profile on an opponent player profile may be determined. This determination of damage may be made by the client device 104 of the player profile in cooperation with the online gaming system 110. However, in cases where server-side hit detection 164 is implemented, the damage imparted by the player profile may be determined by the online gaming server 110 based at least in part on hit information received from the client device 104.

At block 506, a scaling factor for scaling down the amount of damage to the opponent player profile may be determined. As discussed herein, the scaling factor may be specified by way of a hierarchy of progression of severity of penalties to be implemented on a player profile. The particular level of severity of the penalties on the player profile may indicate the magnitude or scaling factor of the damage scaling 168.

At block 508, the amount of damage to the opponent player profile may be scaled according to the scaling factor. For example, if it is determined that 100 units of damage would be normally be inflicted, but the damage scaling factor is 70%, then only 70 units of damage may be inflicted on the opposing player profile during game play. At block 510, online game play may be continued using the scaled damage to the opponent player profile.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
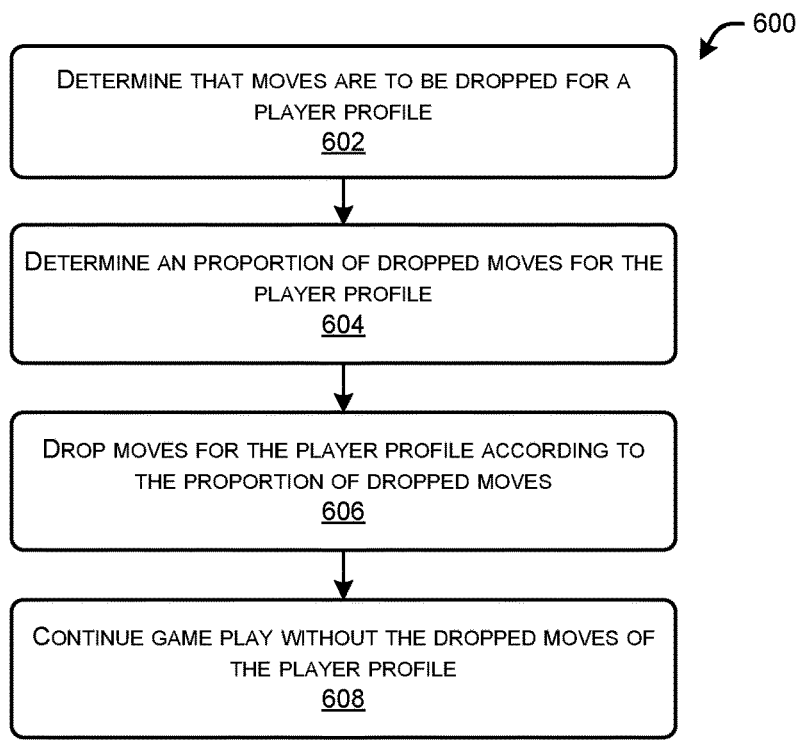
FIG. 6 illustrates a flow diagram of an example method for dropping moves for a player profile, in accordance with example embodiments of the disclosure.

FIG. 6 illustrates a flow diagram of an example method 600 for dropping moves for a player profile, in accordance with example embodiments of the disclosure. The method 600 may be performed by the online gaming system(s) 110, individually or in cooperation with one or more other elements of the environment 100. The method 600 may be an example process performed as part of implementing a game play penalty on a player profile, such as in the operations of blocks 222 of method 200 of FIGS. 2A and 2B.

At block 602, it may be determined that that dropped moves are to be implemented for a player profile. This determination may be based at least in part on determining a level of severity of game play penalty to be imposed on a player profile and then identifying that that level of severity includes implementing dropped moves 170. In example embodiments, the level of severity of game play penalty may also indicate a magnitude of damage scaling to be implemented on the player profile.

At block 604, a proportion of dropped moves for the player profile may be determined. As discussed herein, the proportion of dropped moves may be specified by way of a hierarchy of progression of severity of penalties to be implemented on a player profile. The particular level of severity of the penalties on the player profile may indicate the proportion of dropped moves for implementing the dropped moves 170.

At block 606, moves may be dropped according to the proportion of dropped moves. In some cases, the proportion of dropped moves may be uniform. For example, if 10% of the player profile's moves are to be dropped, then every tenth move may be dropped. In other cases, the dropped moves may not be uniform and may total approximately the target proportion of dropped moves over a certain period of time. For example, the moves selected to be dropped may be selected randomly. Non-uniform dropped moves may make it difficult to compensate for the dropped moves even if cheating, such as by the use of a bot.

At block 608, the online game play may continue without implementing the dropped moves of the player profile. In other words, the moves that were dropped may not result in any movement or action by the player profile's avatar in the online game space, or otherwise change the state of the online game.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

FIG. 7 illustrates a chart 700 with an example of dropped moves for a player profile, in accordance with example embodiments of the disclosure. Intended moves of a player profile is shown in the left column. For example, the player profile may attempt to move, left, left, up, down, down, fire a gun, and so on. With a 20% proportion of dropped moves, the right column shows example dropped moves. As shown, the fifth move (down) may be dropped, as well as the tenth move (crouching). In this way, 20% of the intended moves of the player profile may be dropped.

Although the moves dropped in this example are uniform, such as dropping every fifth move, it should be understood that any suitable mechanism may be implemented for selecting moves to drop. For example, a random number generator may be used that produces a particular outcome corresponding with dropping a move with a 20% probability. Also, moves may be dropped according to other patterns (e.g., Fibonacci pattern, reverse Fibonacci, etc.) and still roughly conform, over time, to the dropped proportion of 20%.

Figure 8:
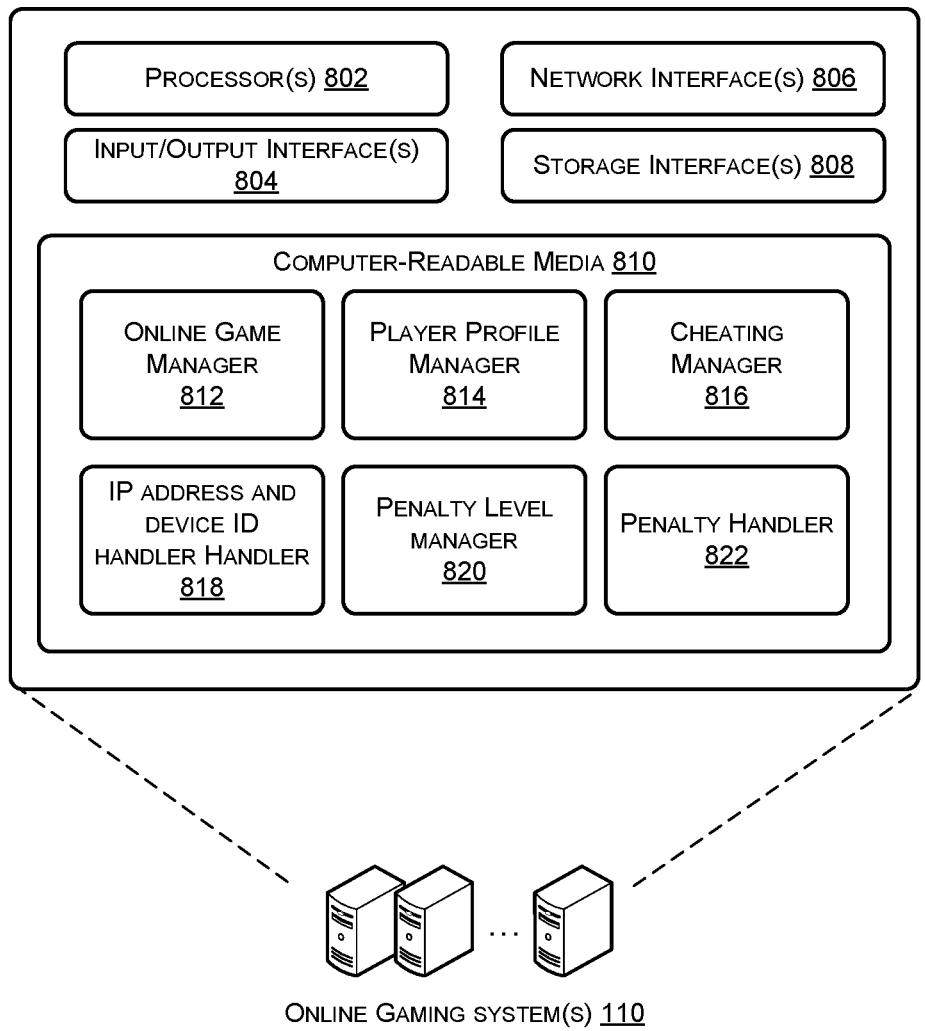
FIG. 8 illustrates a block diagram of example online gaming system(s) that may disadvantage player interactions to provide fairness of online game play, in accordance with example embodiments of the disclosure.

FIG. 8 illustrates a block diagram of example online gaming system(s) 110 that may disadvantage interactions, in accordance with example embodiments of the disclosure. The online gaming system(s) 110 may include one or more processor(s) 800, one or more input/output (I/O) interface(s) 802, one or more communication interface(s) 804, one or more storage interface(s) 806, and computer-readable media 810.

In some implementations, the processor(s) 800 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 800 may possess its own local memory, which also may store program modules, program data, and/or one or more operating system(s). The one or more processor(s) 800 may include one or more cores.

The one or more input/output (I/O) interface(s) 802 may enable the online gaming system(s) 110 to detect interaction with a user and/or other system(s), such as one or more online gaming system(s) 110. The I/O interface(s) 802 may include a combination of hardware, software, and/or firmware and may include software drivers for enabling the operation of any variety of I/O device(s) integrated on the online gaming system(s) 110 interacts, such as displays, microphones, speakers, cameras, switches, and any other variety of sensors, or the like.

The network interface(s) 804 may enable the online gaming system(s) 110 to communicate via the one or more network(s). The network interface(s) 804 may include a combination of hardware, software, and/or firmware and may include software drivers for enabling any variety of protocol-based communications, and any variety of wireline and/or wireless ports/antennas. For example, the network interface(s) 804 may comprise one or more of a cellular radio, a wireless (e.g., IEEE 802.1x-based) interface, a Bluetooth® interface, and the like. In some embodiments, the network interface(s) 804 may include radio frequency (RF) circuitry that allows the online gaming system(s) 110 to transition between various standards. The network interface(s) 804 may further enable the online gaming system(s) 110 to communicate over circuit-switch domains and/or packet-switch domains.

The storage interface(s) 806 may enable the processor(s) 800 to interface and exchange data with the computer-readable medium 810, as well as any storage device(s) external to the online gaming system(s) 110, such as the player profile datastore 140.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 810 may be implemented as computer-readable storage media (CRSM), which may be any available physical media accessible by the processor(s) 800 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 800. The computer-readable media 810 may have an operating system (OS) and/or a variety of suitable applications stored thereon. The OS, when executed by the processor(s) 800 may enable management of hardware and/or software resources of the online gaming system(s) 110.

Several functional blocks having instruction, data stores, and so forth may be stored within the computer-readable media 810 and configured to execute on the processor(s) 800. The computer readable media 810 may have stored thereon an online game manager 812, a player profile manager 814, a cheating manager 816, a network address and device identifier handler 818, a penalty level manager 820, and a penalty handler 822. It will be appreciated that each of the functional blocks 812, 814, 816, 818, 820, 822, may have instructions stored thereon that when executed by the processor(s) 800 may enable various functions pertaining to the operations of the online gaming system(s) 110.

The instructions stored in the online game manager 812, when executed by the processor(s) 800, may configure the online gaming system(s) 110 to host online games for players 102 by interacting with client devices 104 of the players 102 and managing the player's player profiles 150. The online gaming system(s) 110 may be configured to implement any player penalties, as described herein, that are to be implemented on particular players 102 during online game play. The online gaming system(s) may further present APIs 120 for communicating with the client devices 104 and processing the API data, as received via the APIs 120.

The instructions stored in the player profile manager 814, when executed by the processor(s) 800, may configure the online gaming system(s) 110 to track player profiles 150 associated with players who play one or more online games, as hosted by the online gaming system 110. The online gaming system 110 may be configured to manage a player profile datastore 140 where player profiles 150 may be stored and include an indication of whether that player profile has been caught cheating and/or is banned from online game play. Additionally, the player profile 150, as stored on the player profile datastore may indicate network address(es) from which the player profile has accessed the online gaming system(s), as well as one or more device identifiers associated with the client device 104 from which a player profile 150 accesses the online gaming system 110.

The instructions stored in the cheating manager 816, when executed by the processor(s) 800, may configure the online gaming system(s) 110 to identify player profiles that are cheating, such as by using a bot by using any suitable mechanism, such as by using tripwire mechanisms and/or by detecting super-human activities. Although the super-human game play, tripwire, server-side spot checking, and non-standard API call aspects are described herein, the disclosure contemplates other mechanisms of identifying cheating by player profiles, such as any type of analysis of API data 130.

The instructions stored in the network address and device identifier handler 818, when executed by the processor(s) 800, may configure the online gaming system(s) 110 to identify a network address and/or device identifiers associated with a player profile. These network address and/or device identifiers may be determined from one or more communications from a client device 104 associated with player profile.

The instructions stored in the penalty level manager 820, when executed by the processor(s) 800, may configure the online gaming system(s) 110 to identify a number of levels of severity of penalties to impose on a player profile that has been linked to a prior player profile that had been found to have cheated during game play. The online gaming system 110 may be configured to track, such as in the player profile datastore 140, the level of severity of penalties associated with a player profile. Thus, player profiles that are linked to that player profile with have that level of severity of player penalties imposed thereon.

The instructions stored in the penalty handler 822, when executed by the processor(s) 800, may configure the online gaming system(s) 110 to impose penalties, including the magnitude of the penalties on the player profile during game play. For example, the online gaming system 110 may be configured to impose server-side hit detection 164, latency penalty 166, damage scaling 168, dropped moves 170, or any other suitable type of online gaming penalty.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An online gaming system, comprising:
one or more processors; and
one or more computer-readable media storing (i) profile data including records of instances of cheating in online games, and (ii) computer-executable instructions that, when executed by the one or more processors, cause the one or more processors to:
receive, from one or more computing devices, one or more requests for corresponding player profiles to participate in an online video game;
identify, from among the player profiles, a first player profile that is to participate in an online game;
determine at least one of a network address or a device identifier associated with the computing device corresponding to the first player profile;
determine, based at least in part on the network address or the device identifier, that the first player profile is associated with a second player profile;
determine, based on the stored profile data, that the second player profile has previously been found to have cheated during an online game;
determine, based at least in part on the determination that the first player profile is associated with the second player profile previously determined to have cheated, a level of severity of online game penalties to be imposed on the first player profile, the level of severity of online game penalties defining one or more penalties to be implemented on the first player profile, wherein at least one of the one or more penalties impede the ability fully engage in the online game; and
start or continue the online game for the first player profile with the one or more penalties implemented on the first player profile including:

receiving, via a network, an input from the one or more computing devices associated with the player profiles participating in an instance of the online game;
generating updated game state information representing a game state of the online game based on the input and the one or more penalties implemented on the first player profile; and
outputting the updated game state information to the one or more computing devices.

2. The online gaming system of claim 1, wherein the computer-executable instructions further cause the one or more processors to:
determine a timestamp associated with when the second player profile was found to have cheated during online game play;
determine, based at least in part on the timestamp, that a threshold amount of time has passed since the second player profile was found to have cheated during online game play; and
engage, based at least in part on the threshold amount of time passing since the second player profile was found to have cheated during online game play, the first player profile in online game play with no penalties implemented.

3. The online gaming system of claim 1, wherein the network address is a first network address and the device identifier is a first device identifier, and wherein to determine that the first player profile is associated with the second player profile, the computer-executable instructions further cause the one or more processors to:
access, in a player profile datastore, a second network address associated with the second player profile or a second device identifier associated with the second player profile; and
determine that at least one of the first network address matches the second network address or the first device identifier matches the second device identifier.

4. The online gaming system of claim 1, wherein to start or continue online game play for the first player profile with the one or more penalties implemented on the first player profile, the computer-executable instructions further cause the one or more processors to:
receive information associated with a potential hit on an intended target during online game play;
determine, without a hit assertion by a client device associated with the first player profile and based at least in part on information associated with the potential hit, that the potential hit is a hit of the intended target; and
continue the online game play implementing the hit of the intended target.

5. The online gaming system of claim 1, wherein to start or continue online game play for the first player profile with the one or more penalties implemented on the first player profile, the computer-executable instructions further cause the one or more processors to:
determine, based at least in part on information associated with a potential hit, an amount of damage imparted to an opposing player account;
determine a damage scaling factor associated with the level of severity of online game penalties;
scale the amount of damage imparted using the damage scaling factor to generate a scaled amount of damage; and
continue the online game play with the scaled amount of damage imparted on the opposing player account.

6. The online gaming system of claim 1, wherein to start or continue online game play for the first player profile with the one or more penalties implemented on the first player profile, the computer-executable instructions further cause the one or more processors to:
- receive an indication of a plurality of intended moves for the first player profile; and
- determine a proportion of dropped moves associated with the level of severity of online game penalties;
- determine, according to the proportion of dropped moves, one or more of the plurality of intended moves as unimplemented moves and the other of the plurality of intended moves as implemented moves; and
- continue the online game play with implementing the implemented moves for the first player profile.

7. The online gaming system of claim 1, wherein to start or continue online game play for the first player profile with the one or more penalties implemented on the first player profile, the computer-executable instructions further cause the one or more processors to:
- determine that actions of the first player profile are compensated with a latency compensation;
- determine that the latency compensation is to be removed based at least in part on the level of severity of online game penalties; and
- continue the online game play without latency compensation for the first player profile.

8. The online gaming system of claim 1, wherein the computer-executable instructions further cause the one or more processors to:
- determine that the first player profile had cheated during online game play;
- ban the first player profile; and
- associate, with the first player profile a second level of severity of online game penalties, wherein the second level of severity of online game penalties define a second one or more penalties that are more severe than the one or more penalties.

9. An online gaming method, comprising:
- receiving, by an online gaming system and from one or more computing devices, one or more requests for corresponding player profiles to participate in an online video game, the online gaming system including one or more computer-readable media storing profile data including records of instances of cheating in online games;
- identifying, from among the player profiles, a first player profile that is to participate in an online game;
- determining that the first player profile is associated with a second player profile;
- determining, based on the stored profile data, that the second player profile has previously been found to have cheated during an online game;
- determining, based at least in part on the determination that the first player profile is associated with the second player profile previously determined to have cheated, that the second player profile is associated with a level of severity of online game penalties to be imposed on the first player profile, the level of severity of online game penalties defining one or more penalties to be implemented on the first player profile, wherein at least one of the one or more penalties impede the ability fully engage in the online game; and
- starting or continuing the online game for the first player profile with the one or more penalties implemented on the first player profile including:
  - receiving, via a network, an input from the one or more computing devices associated with the player profiles participating in an instance of the online game;
  - generating updated game state information representing a fame state of the online game based on the input and the one or more penalties implemented on the first player profile; and
  - outputting the updated game state information to the one or more computing devices.

10. The online gaming method of claim 9, wherein determining that the first player profile is associated with the second player profile further comprises:
- determining at least one of a first network address or a first device identifier associated with the first player profile;
- accessing, in a player profile datastore, a second network address associated with the second player profile or a second device identifier associated with the second player profile; and
- determining that at least one of the first network address matches the second network address or the first device identifier matches the second device identifier.

11. The online gaming method of claim 9, further comprising:
- determining a timestamp associated with when the second player profile was found to have cheated during online game play;
- determining, based at least in part on the timestamp, that a threshold amount of time has passed since the second player profile was found to have cheated during online game play; and
- engaging, based at least in part on the threshold amount of time passing since the second player profile was found to have cheated during online game play, the first player profile in online game play with no penalties implemented.

12. The online gaming method of claim 9, wherein the one or more penalties comprise a combination of server-side hit detection, latency penalty, damage scaling, or dropped moves.

13. The online gaming method of claim 9, further comprising:
- determining that the first player profile had cheated during online game play;
- banning the first player profile from online game play; and
- associating, with the first player profile a second level of severity of online game penalties, wherein the second level of severity of online game penalties define a second one or more penalties that are more severe than the one or more penalties.

14. The online gaming method of claim 9, further comprising:
- identifying a third player profile that is to play an online game;
- determining that the third player profile is not associated with any other player profile; and
- allowing the third player profile to play the online game play without any penalties.

15. A system, comprising:
- one or more processors; and
- one or more computer-readable media storing (i) profile data including records of instances of cheating in online games, and (ii) computer-executable instructions that, when executed by the one or more processors, cause the one or more processors to:
  - determine that a first player profile had cheated during online game play;
  - ban the first player profile from online game play;
  - associate the first player profile with a level of severity of online game penalties, the level of severity of online game penalties defining one or more penalties to be implemented on other player profiles associated with the first player profile, wherein at least one of the one or more penalties impede the ability fully engage in the online game;

receiving, by an online gaming system and from one or more computing devices, one or more requests for corresponding player profiles to participate in an online video game;

identifying, from among the player profiles, a second player profile that is to participate in an online game;

determine that the second player profile is associated with the first player profile;

determine, based on the stored profile data, that the first player profile has previously been found to have cheated during an online game;

determine, based at least in part m the determination that the second player profile is associated with the first player profile previously determined to have cheated, that the first player profile is associated with a level of severity of online game penalties to be imposed on the second player profile; and start or continue online game play for the second player profile with the one or more penalties implemented on the second player profile including:

receiving, via a network, an input from the one or more computing devices associated with player profiles participating in an instance of the online game;

generating updated game state information representing a game state of the online game based on the input and the one or more penalties implemented on the second player profile; and outputting the updated game state information to the one or more computing devices.

16. The system of claim 15, wherein to determine that a second player profile is associated with the first player profile, the computer-executable instructions further cause the one or more processors to:

access, in a player profile datastore, a first network address associated with the first player profile or a first device identifier associated with the first player profile;

determine a second network address associated with the second player profile or a second device identifier associated with the second player profile; and determine that at least one of the first network address matches the second network address or the first device identifier matches the second device identifier.

17. The system of claim 15, wherein the computer-executable instructions further cause the one or more processors to:

determine a timestamp associated with when the first player profile was found to have cheated during online game play;

determine, based at least in part on the timestamp, that a threshold amount of time has passed since the first player profile was found to have cheated during online game play; and engage, based at least in part on the threshold amount of time passing since the first player profile was found to have cheated during online game play, the second player profile in online game play with no penalties implemented.

18. The system of claim 15, wherein to start or continue online game play for the first player profile with the one or more penalties implemented on the first player profile, the computer-executable instructions further cause the one or more processors to:

receive an indication of a plurality of intended moves for the second player profile; and determine a proportion of dropped moves associated with the level of severity of online game penalties;

determine, according to the proportion of dropped moves, one or more of the plurality of intended moves as unimplemented moves and the other of the plurality of intended moves as implemented moves; and continue the online game play with implementing the implemented moves for the second player profile.

19. The system of claim 15, wherein the computer-executable instructions further cause the one or more processors to:

identify a third player profile that is to play an online game;

determine that the third player profile is not associated with any other player profile; and allow the third player profile to play the online game play without any penalties.

20. The system of claim 15, wherein the computer-executable instructions further cause the one or more processors to:

determine that the second player profile had cheated during online game play;

ban the second player profile from online game play; and associate, with the second player profile a second level of severity of online game penalties, wherein the second level of severity of online game penalties define a second one or more penalties that are more severe than the one or more penalties.

* * * * *